United States Patent
Wu et al.

(10) Patent No.: US 9,024,580 B2
(45) Date of Patent: May 5, 2015

(54) SMART CHARGING SYSTEM FOR MOBILE VEHICLES AND METHOD OF OPERATING THE SAME

(75) Inventors: Ching-Horng Wu, Taoyuan County (TW); Jian-Wei Hu, Taoyuan County (TW)

(73) Assignee: Delta Electronics, Inc., Taoyuan County (TW)

( * ) Notice: Subject to any disclaimer, the term of this patent is extended or adjusted under 35 U.S.C. 154(b) by 402 days.

(21) Appl. No.: 13/547,043

(22) Filed: Jul. 12, 2012

(65) Prior Publication Data

US 2013/0020992 A1    Jan. 24, 2013

Related U.S. Application Data

(60) Provisional application No. 61/509,685, filed on Jul. 20, 2011.

(51) Int. Cl.
| | |
|---|---|
| *H02J 7/00* | (2006.01) |
| *H01M 10/44* | (2006.01) |
| *H04L 29/08* | (2006.01) |
| *B60L 11/18* | (2006.01) |
| *H04W 12/08* | (2009.01) |

(52) U.S. Cl.
CPC .......... *H01M 10/44* (2013.01); *H01M 2220/20* (2013.01); *Y02T 90/168* (2013.01); *Y04S 30/12* (2013.01); *H04W 12/08* (2013.01); *H04L 67/12* (2013.01); *H04L 67/02* (2013.01); *H02J 7/0027* (2013.01); *B60L 11/1844* (2013.01); *B60L 11/1846* (2013.01); *Y02T 10/7005* (2013.01); *Y02T 90/16* (2013.01); *Y02T 90/163* (2013.01); *Y02T 90/169* (2013.01); *Y02T 90/14* (2013.01); *Y02T 90/128* (2013.01); *Y02T 10/7055* (2013.01); *Y04S 10/126* (2013.01); *Y04S 30/14* (2013.01); *Y02E 60/721* (2013.01); *Y02T 90/121* (2013.01)

(58) Field of Classification Search
CPC ............ H02J 2007/0001; H02J 7/0004; H02J 7/0018; Y04S 50/10
USPC ........................................................ 320/109
See application file for complete search history.

(56) References Cited

U.S. PATENT DOCUMENTS

| | | | | |
|---|---|---|---|---|
| 8,072,184 | B2 * | 12/2011 | Bhade et al. ................... | 320/109 |
| 8,569,994 | B2 * | 10/2013 | Dougherty .................... | 320/109 |

(Continued)

FOREIGN PATENT DOCUMENTS

CN       102055790 A       5/2011

OTHER PUBLICATIONS

The Office Action Dated Apr. 28, 2014 of the Corresponding China Patent Application No. 201110440280.4.

*Primary Examiner* — Richard Isla Rodas
*Assistant Examiner* — Moustafa Khalil
(74) *Attorney, Agent, or Firm* — Chun-Ming Shih; HDLS IPR Services

(57) ABSTRACT

A smart charging system for mobile vehicles includes a charging apparatus, a meter, and a cloud server. The charging apparatus is connected between an electric grid and an electric vehicle. The charging apparatus is supplied by the electric grid and then provides power to supply the electric vehicle. The meter is operatively connected between the electric grid and the charging apparatus. The meter has a communication with the electric grid to obtain supplied power from the electric grid to the charging apparatus. The cloud server is operatively connected to the electric grid and further operatively connected to the charging apparatus via a gateway apparatus to receive power-supplying information of the electric grid and power-charging information of the electric vehicle. Further, the charging apparatus smartly charges the electric vehicle according to the power-supplying information and the power-charging information.

17 Claims, 6 Drawing Sheets

(56) References Cited

U.S. PATENT DOCUMENTS

| | | |
|---|---|---|
| 2009/0091291 A1 | 4/2009 | Woody et al. |
| 2010/0315197 A1* | 12/2010 | Solomon et al. ............... 340/5.2 |
| 2011/0029144 A1* | 2/2011 | Muller et al. ................. 700/293 |
| 2012/0161925 A1* | 6/2012 | Gale et al. .................... 340/5.28 |
| 2012/0173292 A1* | 7/2012 | Solomon et al. .................. 705/5 |
| 2012/0265362 A1* | 10/2012 | Yasko ........................... 700/297 |
| 2012/0310433 A1* | 12/2012 | Littrell ......................... 700/297 |

* cited by examiner

SMART CHARGING SYSTEM FOR MOBILE VEHICLES AND METHOD OF OPERATING THE SAME

CROSS REFERENCE TO RELATED APPLICATIONS

This application claims priority of U.S. Provisional Application No. 61/509,685 filed on Jul. 20, 2011 under 35 U.S.C. §119(e), the entire contents of which are hereby incorporated by reference.

BACKGROUND

1. Technical Field

The present disclosure relates generally to a smart charging system and a method of operating the same, and more particularly to a smart charging system for mobile vehicles and a method of operating the same.

2. Description of Related Art

The design and development of Electric Vehicle Supply Equipment (EVSE) has traditionally been performed without communication to the electrical grid. The focus to date has been on power protection, billing, and security functions. Although these functions provide the minimum required for EV charging, future EVSE must adapt to become more capable.

Future EVSE will require grid connectivity for several reasons. Chief among these is the need to manage utility load profiles. Increased grid loads are one consequence of mass-adoption of plug-in electric vehicles (PEVs) or hybrid electric vehicles (HEVs). If this load can be effectively managed, for example by shifting charging times to off-peak hours, the power generation and distribution network can run with better utilization, without adding new generating plants. Smart charging also enables better utilization of local distribution assets such as transformers. Avoiding local transformer upgrades through load diversification and intelligent peak-load management is a primary cost-avoidance strategy of electric utilities. This was stressed in stating that "capacity is not an issue," but rather the issue is the high localized demand within a neighborhood. A smart EVSE must support utility companies in such issues with the minimal effort required from the utility.

But most importantly, the consumer of a plug-in-vehicle benefits from smart EVSEs. By shifting Plug-in Electric Vehicle (PEV) charging to nighttime hours, the costs of power not only drop, but in some cases even go negative in so called—"negative LMP (Locational Marginal Pricing)" scenarios (which are often associated with the growing presence of wind power on the grid). A smarter EVSE can also be an enabler of DC fast-charging, which helps overcome charge-time issues for PEV buyers. Smart charging is needed to unlock the value of PEVs, and push them forward into the mass market. In summary, smart EVSEs are a core component of the electric-vehicle future.

The need for smart-charging is intertwined with the issue of EVSE (charging apparatus) cost. The use of existing communication protocols, such as CDMA modems and cellular network communication is a major driver of costs at the systems level. If every EVSE was to employ cellular communications for grid-communication, costs will simply be too high. There is a need for an optimized communications strategy for smart EVSEs, which minimizes overall cost while providing effective management of EV charging and grid loads. A second related issue is the hardware cost of the EVSE itself. According to Plug-In America, today's Level 2 (L2), UL Listed EVSEs cost between $1000 and $4500. This cost is itself a barrier to mass-market adoption of EVs; and this cost does not yet include grid-communication hardware and software. The addition of such hardware, and particularly multiple variants of communication protocols, such as CDMA, Wi-Fi, and so on, could be a driver of future costs. Although there exists not just one solution, notwithstanding an optimized low-cost route must be developed, considering the EVSE as a system, and taking advantage of low-cost technologies throughout the EVSE design.

Accordingly, it is desirable to provide a smart charging system for mobile vehicles and a method of operating the same to smartly charge the electric vehicle according to the power-supplying of the utility grid and the power-charging information of the electric vehicle.

SUMMARY

An object of the invention is to provide a charging apparatus to solve the above-mentioned problems. The charging apparatus is connected between a utility grid and an electric vehicle. The charging apparatus includes a measurement unit, a communication unit, and a control unit. The measurement unit is connected to the utility grid and configured to measure an output voltage and an output current of the utility grid. The communication unit is configured to receive an output voltage information and an output current information of the utility grid, a charging voltage information and a charging current information of the electric vehicle, and a load condition information of the utility grid. The control unit is connected to the measure unit and the communication unit. The control unit is configured to control the utility grid to adaptively charge the electric vehicle via a charging connection unit according to the output voltage information, the output current information, the charging voltage information, the charging current information, and the load condition information when the control unit meets a charge authorization condition.

Another object of the invention is to provide a smart charging system for mobile vehicles to solve the above-mentioned problems. The smart charging system for mobile vehicles includes a charging apparatus, a meter, and a cloud server. The charging apparatus is connected between a utility grid and an electric vehicle; wherein the charging apparatus is supplied by the utility grid and the electric vehicle is charged by the charging apparatus. The meter is operationally connected between the utility gird and the charging apparatus; wherein the meter is communicated to the utility grid to obtain an output voltage information and an output current information are provided from the utility grid to the charging apparatus. The cloud server is operationally connected to the utility grid; wherein the cloud server is further operationally connected to the charging apparatus via a gateway apparatus to receive the output voltage information and the output current information of the utility grid and a charging voltage information and a charging current information of the electric vehicle. The charging apparatus configured to adaptively charge the electric vehicle according to the output voltage information, the output current information, the charging voltage information, the charging current information, and a load condition information of the utility grid when the charging apparatus meets a charge authorization condition.

Further another object of the invention is to provide a method of smartly charging mobile vehicles for charging an electric vehicle by a utility grid to solve the above-mentioned problems. The method of smartly charging mobile vehicles includes steps as follows: (a) a charging apparatus is provided, wherein the charging apparatus is connected between the charging apparatus and the electric vehicle; (b) a charging request command is provided from the electric vehicle, wherein the charging request command is sent to the utility grid via the charging apparatus to propose a charging request to the utility grid; (c) a charging permit command is provided from the utility grid, wherein the charging permit command is sent to the electric vehicle via the charging apparatus to allow charging the electric vehicle; (d) a charging validation command is provided from the electric vehicle, wherein the charging validation command is sent to the utility grid via the charging apparatus to propose a charging notice to the utility grid; and (e) the electric vehicle is charged by the utility grid via the charging apparatus.

It is to be understood that both the foregoing general description and the following detailed description are exemplary, and are intended to provide further explanation of the invention as claimed. Other advantages and features of the invention will be apparent from the following description, drawings and claims.

DETAILED DESCRIPTION

Figure 1:
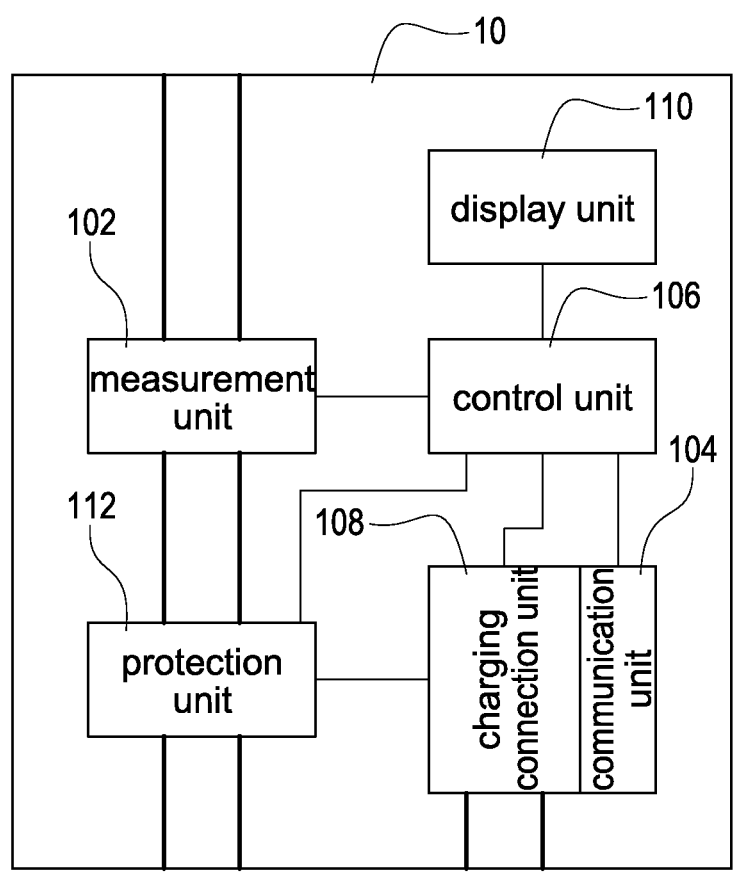
FIG. 1 is a schematic block diagram of a charging apparatus according to the present disclosure.

This present disclosure contains an optimized approach for low-cost implementation of smart charging apparatuses for residential use. The optimized approach considers several novel strategies allowing for cost optimization in a smart-grid-enabled charging apparatus, including designing a streamlined smart charging apparatus architecture, addressing the localized transformer overload issue, developing a novel software communication algorithm, PLC communication between the smart EVSE and the PEV, employing Zig-Bee wireless technology, integrating multiple features, combining all functions by one microprocessor, moving the location-dependent communication link to the utility company, providing an optional Wi-Fi communication, providing automatic detection, and using mass-production-capable design philosophies.

The streamlined smart charging apparatus architecture relies on low-cost local wireless connectivity between the charging apparatus and Home Area Network (HAN) gateway or Home Energy Gateway (HEG), thus minimizing the communication requirements and cost of the charging apparatus. By creating an EVSE-to-EVSE (E2E) communication network, a Neighborhood Area Network (NAN) to address the localized transformer overload issue, where EVSEs (namely, the charging apparatuses) within a neighborhood can intelligently communicate to one another and determine the optimal charging sequence to prevent a transformer overload, all while not requiring any communication to the utility company. A novel software communication algorithm incorporating a two-layer structure: (1) address transformer overloading by a neighborhood E2E communication strategy and (2) address power overloading with bi-directional communication to the utility company. ZigBee wireless technology is employed for communication at the charging apparatus provides all the required functions to the gateway at the least possible cost. Integrating multiple features, such as power protection, revenue grade metering, and so on, together that are typically sold today as individual packages by different manufacturers, thus allowing for less total component count (estimated to be a reduction by 50% on system level), minimizing duplicate circuits, and ultimately reducing costs. Combination of all functions to be handled by one microprocessor, reducing costs at the circuit board level and increasing control and algorithm capability. The location-dependent communication link is moved to the utility to an inexpensive, replaceable gateway. An optional Wi-Fi (802.11) communication is provided to support households without a home energy gateway. Automatic detection of gateways, Advanced Metering Infrastructure (AMI) meters, and other smart EVSEs are provided.

Reference will now be made to the drawing figures to describe the present disclosure in detail.

Reference is made to FIG. 1 which is a schematic block diagram of a charging apparatus according to the present disclosure. The charging apparatus 10 is connected between an external AC utility grid and an electric vehicle. The charging apparatus 10 includes a measurement unit 102, a communication unit 104, and a control unit 106. The measurement unit 102 is connected to the external AC utility grid to measure an output voltage and an output current of the utility grid. The communication unit 104 receives electricity supply information of the utility grid, charging information of the electric vehicle, and load condition information of the utility grid. In particular, the electricity supply information includes output voltage information and output current information of the utility grid. The charging information of the electric vehicle includes charging voltage information and charging current information of the electric vehicle. The load condition information shows the load conditions (e.g., heavy load, mid load, or light load) of the utility grid. Further, the communication unit 104 has a ZigBee protocol function, a Wi-Fi protocol function, or a blue tooth protocol function. The control unit 106 is connected to the measurement unit 102 and the communication unit 104. Note that, the control unit 106 controls the external AC utility grid to adaptively charge the electric vehicle via a charging connection unit 108, which is connected between the electric vehicle and the control unit 106, according to the electricity supply information of the utility grid, the charging information of the electric vehicle, and the load condition information of the utility grid. In particular, the charging connection unit 108 is a SAE J1772 connector with a power line communication (PLC). In addition, the charging apparatus further includes a display unit 110 and a protection unit 112, which are connected to the control unit 106. The control unit 106 controls the display unit 110 to display conditions of supplying power from the utility grid to the electrical vehicle and controls the protection unit 112 to provide a ground fault protection, an over-current protection, or an over-voltage protection.

Figure 2:
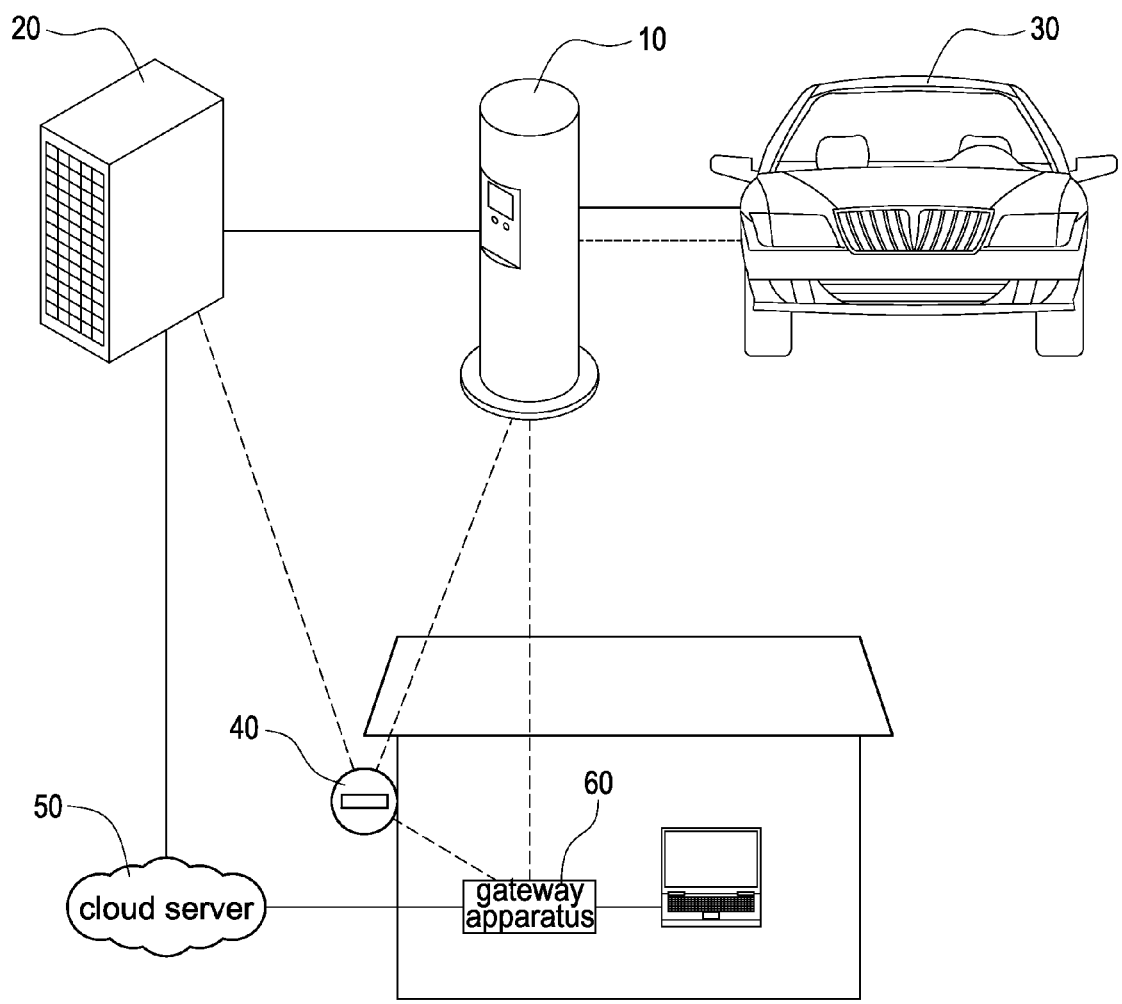
FIG. 2 is a schematic view of a smart charging system for mobile vehicles according to the present disclosure.

Reference is made to FIG. 2 which is a schematic view of a smart charging system for mobile vehicles according to the present disclosure. The smart charging system for mobile vehicles includes a charging apparatus 10, a meter 40, and a cloud server 50. The charging apparatus 10 is connected between a utility grid 20 and an electric vehicle 30 to charge the electric vehicle 30 by the utility grid 20. The meter 40 is operationally connected between the utility grid 20 and the charging apparatus 10. The meter 40 is communicated to the utility grid 20 to obtain the output voltage information and the output current information provided from the utility grid 20 to the charging apparatus 10. The cloud server 50 is operationally connected to the utility grid 20. The cloud server 50 is further operationally connected to the charging apparatus 10 via a gateway apparatus 60 to receive the output voltage information and the output current information of the utility grid 20 and the charging voltage information and the charging current information of the electric vehicle 30. In particular, the charging apparatus 10 adaptively charges the electric vehicle 30 when the charging apparatus 10 meets a charge authorization condition.

Note that, the charge authorization condition includes a charging request authorization mode, a charging permit authorization mode, and a charging notice authorization mode. The charging request authorization mode means that when the electric vehicle provides a charging request command to the utility via the charging apparatus 10, the utility grid 20 judges whether to receive the charging request command according to the load conditions of the utility grid 20. In which, the utility grid 20 receives the charging request command when the load condition is a light-load condition; whereas the utility grid 20 rejects the charging request command when the load condition is a heavy-load condition. The charging permit authorization mode means that when the utility grid 20 provides a charging permit command to the electric vehicle 30 via the charging apparatus 10, the electric vehicle 30 judges whether to receive the charging permit command according to the output voltage information and the output current information of the utility grid 20. In which, the electric vehicle 30 receives the charging permit command when the output voltage and output current of the utility grid 20 meet the required charging voltage and charging current of the electric vehicle 30; whereas the electric vehicle 30 rejects the charging permit command when the output voltage and output current of the utility grid 20 do not meet the required charging voltage and charging current of the electric vehicle 30. The charging notice authorization mode means that when the electric vehicle 30 provides a charging validation command to the utility grid 20 via the charging apparatus 10, the utility grid 20 judges whether to receive the charging validation command according to the required charging voltage information and the charging current information of the electric vehicle 30. In which, the utility grid 20 receives the charging validation command when the required charging voltage and charging current of the electric vehicle 30 meet the output voltage and output current of the utility grid 20; whereas the utility grid 20 rejects the charging validation command when the required charging voltage and charging current of the electric vehicle 30 do not meet the output voltage and output current of the utility grid 20. In brief, in order to implement intelligent power distribution and charging operation, the utility grid 20, the electric vehicle 30, and the charging apparatus 10 need to have fully coordinated operations. The charging apparatus 10 monitors the power-supplying information of the utility grid 20, the required power of household equipment, and the charging information of the electric vehicle 30 through the cloud server 50. The charging apparatus 10 controls the required charging volume or charging time to charge the electric vehicle 30 according to the received charging information when the charging request is received to determine to charge the electric vehicle 30 by the user. In other words, it is essential to execute a registration between the charging apparatus 10 and the utility grid 20 before the electric vehicle 30 is charged, thus preventing the disaster occurrence due to unpredictable load conditions. In brief, the unauthorized charging apparatus 10 cannot be provided to charge the electric vehicle 30.

The meter 40 is a smart meter and the charging apparatus 10 communicates to the meter 40 through a wireless local area network protocol (wireless LAN protocol). In particular, the charging apparatus 10 communicates to the meter 40 through the ZigBee protocol, the Wi-Fi protocol, or the blue tooth protocol, but not limited. Also, the gateway apparatus 60 is a ZigBee gateway, the Wi-Fi gateway, or the blue tooth gateway, but not limited.

Figure 3:
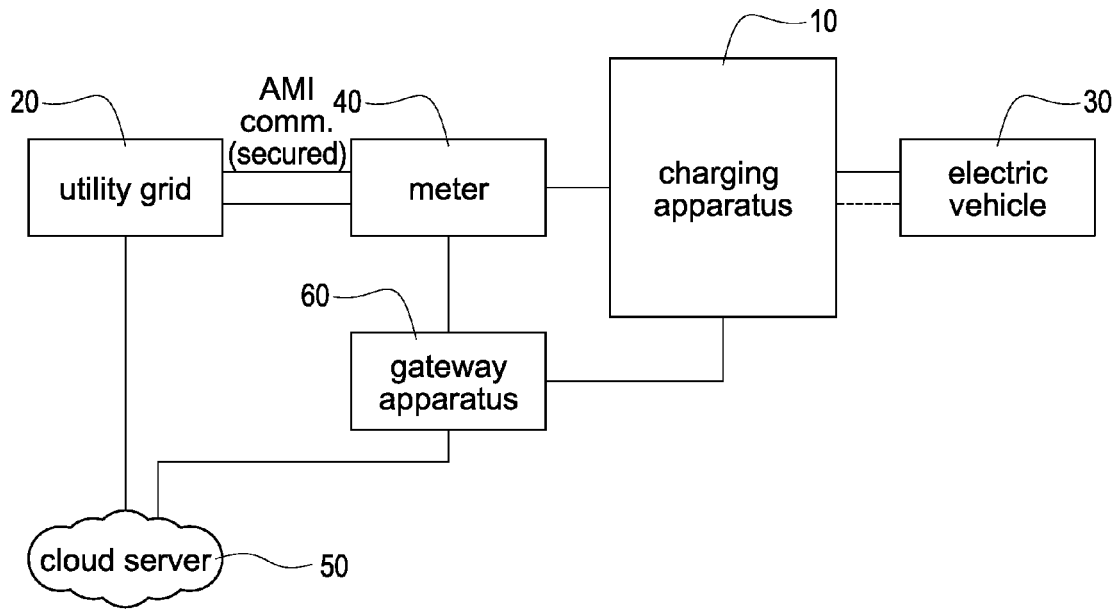
FIG. 3 is a schematic architecture block diagram of the smart charging system for mobile vehicles according to a first embodiment of the present disclosure.

The detailed structures and operations of the smart charging system for mobile vehicles will be described hereinafter with a number of embodiments. Reference is made to FIG. 3 which is a schematic architecture block diagram of the smart charging system for mobile vehicles according to a first embodiment of the present disclosure. This architecture possesses a number of cost saving advantages with simplicity, while still allowing for all of the required smart grid connectivity. As shown in FIG. 3, it is assumed that the advanced metering infrastructure (AMI) is provided and the gateway apparatus 60 is a home energy gateway (HEG). Hence, the user can select the preferred charging demand and then the gateway apparatus 60 and the charging apparatus 10 are used to exchange information.

To take full advantage of the offerings of the smart grid, and to allow for a universal interface to the vast array of utility companies, the gateway apparatus 60 is required. This allows connecting multiple smart energy products, such as Programmable Control Thermostats (PCTs), In-Home Displays (IHDs) and PEVs, to the utility with one common interface enabling data transfer to the cloud server 50. Once information is available on the cloud server 50 for utility companies, the smart grid options become endless. Additionally, the gateway provides a secure communication path to the AMI, allowing for critical information such as the household instantaneous power to be readily available to all products communicating to the gateway apparatus 60, such as the smart charging apparatus 10. The disclosed charging apparatus 10 has an automatic detection of the gateway, allowing for transparent "plug-and-play" handshake functionality to the consumer.

Once more consumers understand the potential monetary savings of such smart devices, they will become more commonplace and these prices will only reduce with higher competition and greater quantities. Additionally, some utility companies may choose to provide the gateway at no cost to the consumer. The realization of the necessity of a gateway, even for non-PEV buyers, paves the way for the preferred baseline smart charging apparatus topology with minimal communication options required, thus reducing costs and complexity.

ZigBee is viewed as the preferred communication path from the smart charging apparatus 10 to the gateway apparatus 60 due to its data security advantages and alignment to the Smart Energy Profile (SEP) concept. The mainstream communication path for the gateway apparatus 60 to the cloud server 50 is home internet, although other options such as General Packet Radio Service (GPRS) are possible, depending on the available communication at the residence. Since the gateway apparatus 60 is seen as a small, inexpensive, and interchangeable device, adaptions to other communication methods can be easily realized if the future moves toward this direction.

Especially, the used gateway apparatus 60 between the charging apparatus 10 and the cloud server 50 can be divided into following categories: the ZigBee gateway, the Wi-Fi gateway, and the blue tooth gateway. In this embodiment, the charging apparatus 10 is operationally connected to the cloud server 50 through the ZigBee gateway 60. In particular, the charging apparatus 10 communicates to the ZigBee gateway 60 through the ZigBee protocol and the cloud server 50 communicates to the ZigBee gateway 60 through the Ethernet protocol.

One of the key concept advantages of the disclosed baseline system architecture is the EVSE-to-EVSE (E2E) communication. It is understood that PEV adoption is not a challenge for generators, but may be difficult for local distribution networks at the neighborhood level. To address this issue, the disclosed charging apparatus 10 communicates with other neighborhood charging apparatuses to determine the optimal charging strategy to minimize the risk of overloading a neighborhood transformer. This Neighborhood Area Network (NAN) using the E2E allows protection without any complications, communication, or changes to the utility company. There are various strategies that can be employed, such as placing a sequential order to the charging events, which may include specific PEV information, such as State-of-Charge (SOC), to improve the strategy. The important point being that the disclosed charging apparatus 10 allows for multiple control strategies. The preferred communication path to realize E2E is through the cloud server 50 by using home internet. However, another option is to use ZigBee E2E communication in areas where this is warranted. In practical terms, ZigBee is limited by approximately 30 m of communication. In concentrated areas such as apartment complexes, townhouses, etc., ZigBee may be a preferred path. One ZigBee module can communicate with multiple charging apparatuses 10 and other receiving and transmitting devices. The disclosed charging apparatus 10 has an automatic detection of neighborhood charging apparatuses, allowing for transparent "plug-and-play" handshake functionality to the consumer. Additionally, the disclosed charging apparatus 10 collects information from the cloud server 50 regarding neighborhood charging apparatuses 10.

Figure 4:
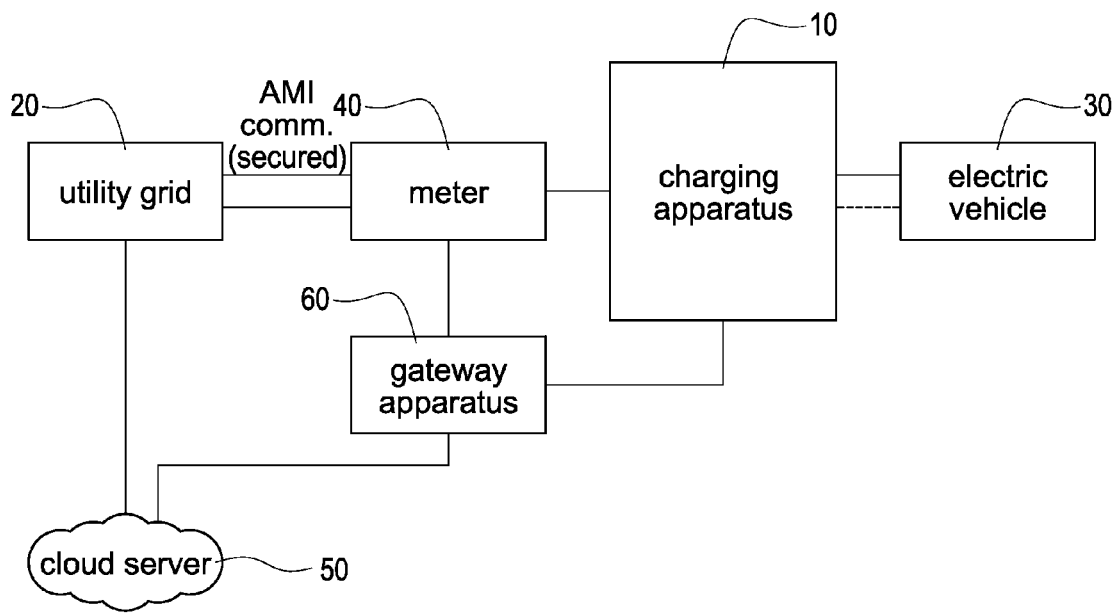
FIG. 4 is a schematic architecture block diagram of the smart charging system for mobile vehicles according to a second embodiment of the present disclosure.

Reference is made to FIG. 4 which is a schematic architecture block diagram of the smart charging system for mobile vehicles according to a second embodiment of the present disclosure. As shown in FIG. 4, all features that were described in the baseline architecture of FIG. 3 are still available, except for the interconnection of any household smart appliance. That is, this architecture considers a home without the Home Energy Gateway (HEG). To achieve this, Wi-Fi is provided as an optional inexpensive add-on available to consumers that choose not to have a gateway, allowing for the path of data transfer to the cloud server 50. In this case, the smart charging apparatus 10 automatically detects that the gateway is missing and automatically begins communicating directly to the AMI meter 40 using ZigBee communication. Therefore all instantaneous household power data is still available to the charging apparatus 10, even without the gateway. Especially, in this embodiment, the charging apparatus 10 is communicated to the Wi-Fi gateway 60 via the Wi-Fi protocol and the cloud server 50 is communicated to the Wi-Fi gateway 60 via the Ethernet protocol when the charging apparatus 10 is operationally connected to the cloud server 50 via the Wi-Fi gateway 60.

Figure 5:
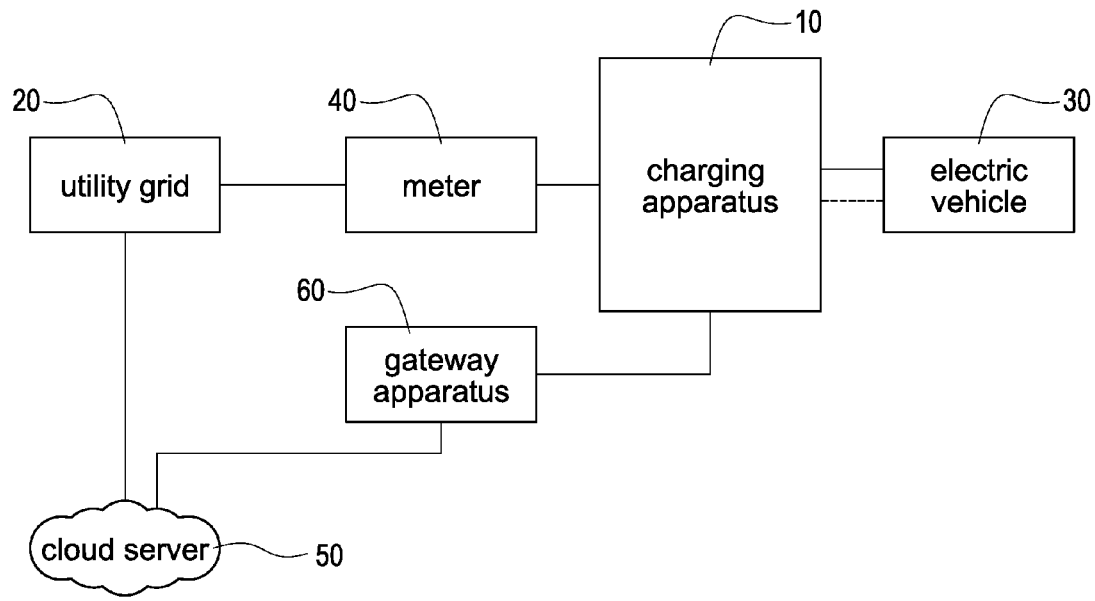
FIG. 5 is a schematic architecture block diagram of the smart charging system for mobile vehicles according to a third embodiment of the present disclosure.

Reference is made to FIG. 5 which is a schematic architecture block diagram of the smart charging system for mobile vehicles according to a third embodiment of the present disclosure. In this embodiment, a household does not have an Advanced Metering Infrastructure (AMI) meter. This may be desirable in the short-term for some locations to overcome the challenges associated with replacing analog electrical meters that may currently exist at a residency, while still allowing the advantages of various billing and time-of-use implementations that can be configured for the electric vehicle charge time optimization. In this case, instantaneous household load information is not available and the charging apparatus 10 has to act into a limited control state. However, this situation can be improved by using the E2E communication of the smart charging apparatus 10 to gather loading information from the neighborhood sharing the same transformer. This allows the possibility of providing better control strategies, with some educated assumptions on the home power, to allow for minimizing the transformer overload risk.

Figure 6:
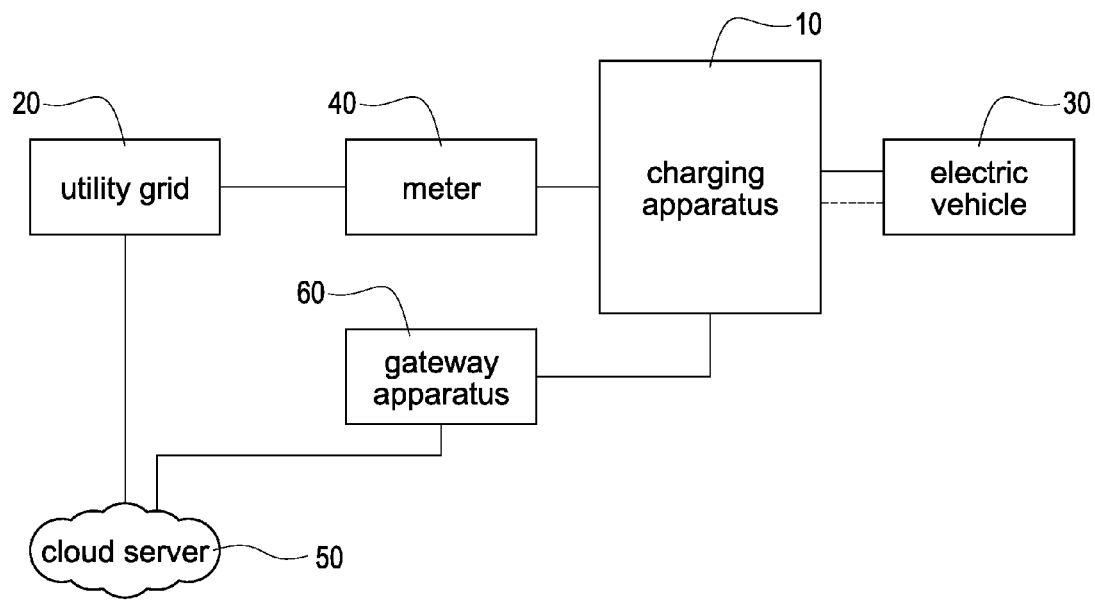
FIG. 6 is a schematic architecture block diagram of the smart charging system for mobile vehicles according to a fourth embodiment of the present disclosure.

Reference is made to FIG. 6 which is a schematic architecture block diagram of the smart charging system for mobile vehicles according to a fourth embodiment of the present disclosure. The embodiment considers the scenario of a household without both the AMI meter and the gateway, as shown in FIG. 6. In this embodiment, the smart charging apparatus 10 uses the combination of strategies defined for the second embodiment and the third embodiment. All embodiments allow for the bi-directional interchange of data between the charging apparatus 10 and the utility grid 20 through the cloud server 50. In cases where the Wi-Fi communication is not available, it is required to have an appropriate gateway to communicate to the cloud server 50 based on the available communication for the locale. Furthermore, if the ZigBee communication within the neighborhood is limited by one or more charging apparatuses 10, data can still be transferred within the neighborhood by utilizing the cloud server 50.

Figure 7:
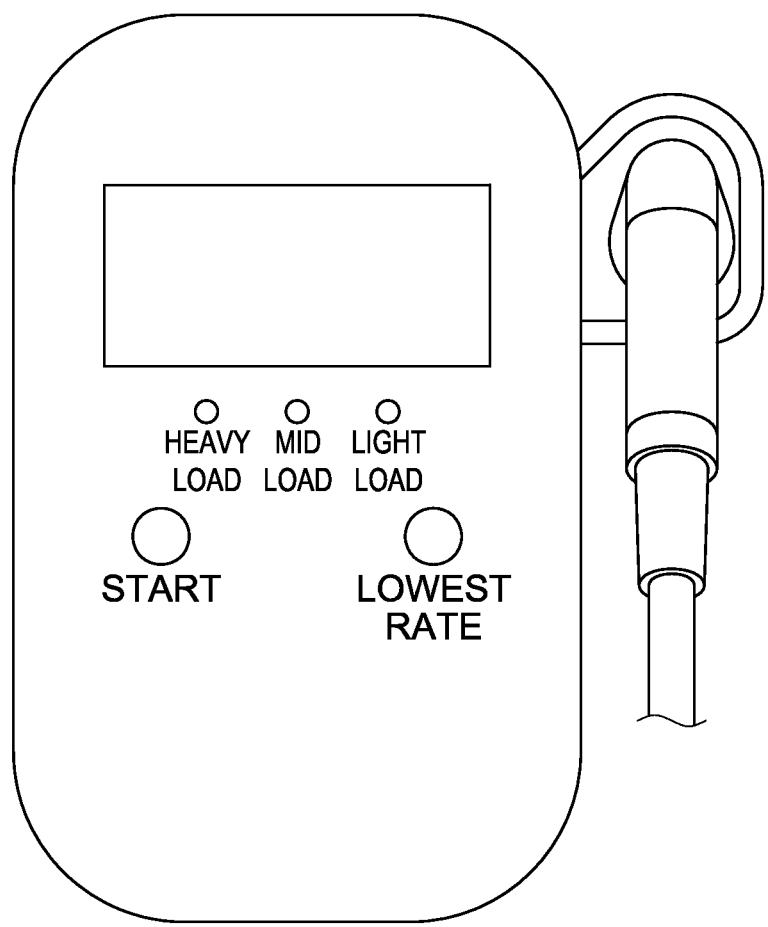
FIG. 7 is a schematic front view of the charging apparatus according to the present disclosure.

Reference is made to FIG. 7 which is a schematic front view of the charging apparatus according to the present disclosure. A "Lowest Rate" feature allows the user to easily select the most economic charging means, while the smart charging apparatus 10 performs the intelligence enabling this low cost charging method. An LCD display at the charging apparatus 10 itself will show information such as date, time, current energy rate, charging mode by battery load percent, Time-of-Use (TOU) price, charging status, and so forth. In one configuration, a series of colored LEDs are used to indicate the charging load, including heavy load, mid load, and light load, to the customer based on a simple R/Y/G system. Alternates will be considered for clear and simple-to-read customer information, based on a combination of the LCD screen and LED displays. Customer inputs will be implemented via a low-cost combination of input actuators; either with buttons as shown, or via a touch-screen display or keypad. The example shown in FIG. 7 includes a button to initiate charging, and a second button to enter a "lowest-rate" mode. In the example configuration shown "lowest rate" would be a customer option to wait for charging, in which case the charging apparatus 10 would schedule charging at a time when rates are low. Presumably, in the middle of the night when grid load is minimized. This is just one option of a human-machine interface that can be developed; numerous other options can be considered for development over the course of the program.

Figure 8:
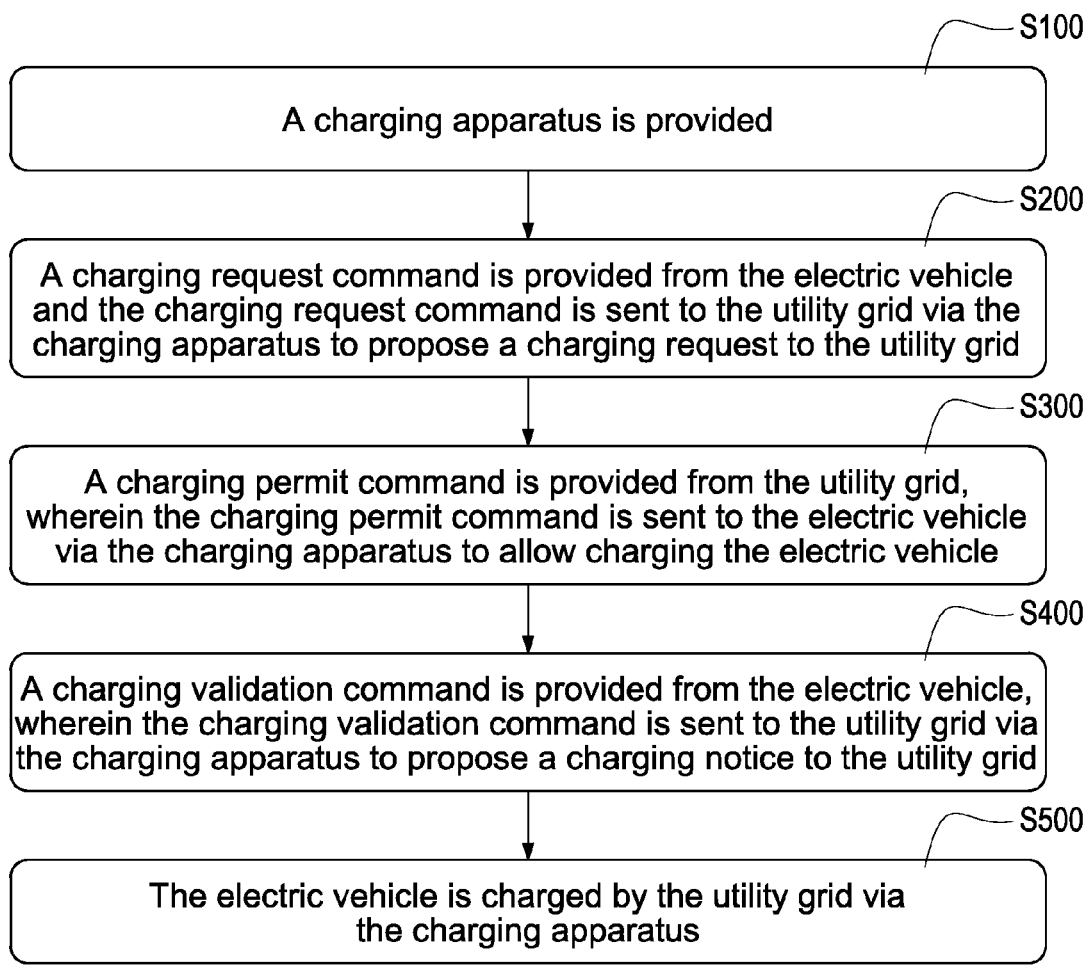
FIG. 8 is a flowchart of operating the smart charging system for mobile vehicles according to the present disclosure.

Reference is made to FIG. 8 which is a flowchart of operating the smart charging system for mobile vehicles according to the present disclosure. The smart charging system is provided to charge an electric vehicle by a utility grid. The method of operating the smart charging system for mobile vehicles includes steps as follows: First, a charging apparatus is provided (S100). The charging apparatus is connected between the utility grid and the electric vehicle. Afterward, a charging request command is provided from the electric vehicle and the charging request command is sent to the utility grid via the charging apparatus to propose a charging request to the utility grid (S200). Especially, a charging request authorization mode is further executed between the electric vehicle, the charging apparatus, and the utility grid when the electric vehicle provides the charging request command to the utility grid. Note that, the utility grid judges whether to receive the charging request command according to the load conditions of the utility grid when the electric vehicle provides the charging request command to the utility via the charging apparatus. In which, the utility grid receives the charging request command when the load condition is a light-load condition; whereas the utility grid rejects the charging request command when the load condition is a heavy-load condition. That is, the utility grid can reject the charging request command proposed from the electric vehicle when the grid loads are in high use and detected by the utility grid; whereas the utility grid can receive the charging request command proposed from the electric vehicle when the gird loads are in low use detected by the utility grid.

Afterward, a charging permit command is provided from the utility grid, wherein the charging permit command is sent to the electric vehicle via the charging apparatus to allow charging the electric vehicle (S300). Especially, a charging permit authorization mode is further executed between the electric vehicle, the charging apparatus, and the utility grid when the utility grid provides the charging permit command to the electric vehicle. Note that, the electric vehicle judges whether to receive the charging permit command according to the output voltage information and the output current information of the utility grid when the utility grid provides the charging permit command to the electric vehicle via the charging apparatus. In which, the electric vehicle receives the charging permit command when the output voltage and output current of the utility grid meet the required charging voltage and charging current of the electric vehicle; whereas the electric vehicle rejects the charging permit command when the output voltage and output current of the utility grid do not meet the required charging voltage and charging current of the electric vehicle.

Afterward, a charging validation command is provided from the electric vehicle, wherein the charging validation command is sent to the utility grid via the charging apparatus to propose a charging notice to the utility grid (S400). Especially, a charging notice authorization mode is further executed between the electric vehicle, the charging apparatus, and the electric vehicle provides the charging validation command to the utility grid. Note that, the utility grid judges whether to receive the charging validation command according to the required charging voltage information and the charging current information of the electric vehicle when the electric vehicle provides a charging validation command to the utility grid via the charging apparatus. In which, the utility grid receives the charging validation command when the required charging voltage and charging current of the electric vehicle meet the output voltage and output current of the utility grid; whereas the utility grid rejects the charging validation command when the required charging voltage and charging current of the electric vehicle do not meet the output voltage and output current of the utility grid. Finally, the electric vehicle is charged by the utility grid via the charging apparatus (S500).

In addition, the method further includes steps as follows: A meter is provided, wherein the meter is operationally connected between the utility grid and the charging apparatus to communicate to the utility grid and obtain the output voltage information and output current information of the utility grid. In particular, the meter is communicated to the charging apparatus via a ZigBee protocol, a Wi-Fi protocol, or a blue tooth protocol. Also, the gateway apparatus is a ZigBee gateway, a Wi-Fi gateway, or a blue tooth gateway. In addition, a cloud server is provided, wherein the cloud server is operationally connected to the utility grid and further operationally connected to the charging apparatus via the gateway apparatus to receive the output current information of the utility grid and the charging voltage information and the charging current information of the electric vehicle.

Especially, the connection between the charging apparatus and the cloud server has following ways:

(1) The charging apparatus is operationally connected to the cloud server via the ZigBee gateway. The charging apparatus is communicated to the ZigBee gateway through the ZigBee protocol and the cloud server is communicated to the ZigBee gateway through the Ethernet protocol;

(2) The charging apparatus is operationally connected to the cloud server via the Wi-Fi gateway. The charging apparatus is communicated to the Wi-Fi gateway through the Wi-Fi protocol and the cloud server is communicated to the Wi-Fi gateway through the Ethernet protocol;

(3) The charging apparatus is operationally connected to the cloud server via the blue tooth gateway. The charging apparatus is communicated to the blue tooth gateway through the blue tooth protocol and the cloud server is communicated to the blue tooth gateway through the Ethernet protocol.

The detailed operation between the charging apparatus, the utility grid, and the electric vehicle is described as follows. First, the plug-in electric vehicle (PEV) is plugged to the power source. Afterward, the charging apparatus obtains the information from the PEV, including charging power, battery state of charge (SOC), and so on. Afterward, the user enters options to the charging apparatus, including immediate or delay, next start time of charging the PEV, and so on. Afterward, the charging apparatus sends the received information to the utility grid after the charging apparatus receives the information from the PEV and the information from the user's options. Afterward, a charge request is determined according to the utility grid load condition, including household power consumption, power demand of other PEVs, and so on. For example, if the load is larger than 85%, the charge request is rejected. In addition, if the load is larger than 70% but less than 85%, the charge request is enabled at a peak rate pricing. Furthermore, if the load is less than 70%, the charge request is accepted. However, the above load ratios are only exemplified but are not intended to limit the scope of the disclosure. Afterward, the utility grid responses the load condition to the charging apparatus and then the charging apparatus informs the user. Afterward, the user confirms the response from the utility grid to judge whether the PEV is charged through the charging apparatus. Finally, the charging apparatus replies the user's answer to the utility grid. Especially, the desired time of executing the entire steps of the method is usually less than 1 minute. Accordingly, the method provides a simple, quick, convenient, and economical operation for charging the PEV. However, the above-mentioned steps can be appropriately adjusted according to the practical application and integration between the utility, the charging apparatus, and the electric vehicle (PEV).

In brief, the utility, the electric vehicle, and the charging apparatus are coordinated to implement the smart power-distributing and charging operation. The charging apparatus is used to monitor the information of the power-supplying capacity of the utility company and the information of total required power of household appliances and the electric vehicles through the cloud server. According to the received information, the charging apparatus controls the required charging power or the charging time to charge the electric vehicle when the charge request is accepted and the user decides to charge the electric vehicle. In other words, a registering operation between the charging apparatus and the utility grid is essential before the electric vehicle is accepted to be charged. In particular, the register confirmation is established during the cooperation between the charging apparatus, the utility grid, and the electric vehicle. That is, unregistered EVSEs cannot be provided to execute charging the electric vehicles in order to prevent the utility companies from disaster events due to the unpredictable load conditions.

Variants on this theme include a variety of TOU or other load-balancing measures by the utility grid, variants on the customer input preference including pre-set defaults, and other parameters. In the case shown, the inputs of the customer and the utility grid are highly variable, but can be comprehensively supported by the smart charging apparatus. For example: (a) The smart charging apparatus may have LED or other real-time indicators of the grid load at the current time, or of a pricing signal associated with load, which provides input before the customer provides input to the charging apparatus; (b) The customer may seek to reserve charging time in a low-cost TOU block or other off-peak time according to a structure laid out by the utility grid, which can be scheduled by the utility grid and enabled by the smart charging apparatus; (c) The utility grid may restrict power flow to a lower value in peak conditions; e.g., by directing the charging apparatus to charge at a 3.3 kW or lower rate during peak times; and (d) The full registration process lasts approximately 10 minutes. This process is only one variant of many potential options offered by this smart charging apparatus architecture. With close cooperation between all parties, several optimized in-use control concepts will be developed over the course of the project.

In conclusion, the present disclosure has following advantages:

1. Simple and streamlined communication interfaces are required;

2. All required functional utility-to-PEV within one smart charging apparatus package (revenue grade meter, power protection, communication, etc.) providing an estimated 50% reduction to system component count;

3. Ease of adapting to any future communications by utilizing an inexpensive, interchangeable gateway to the cloud server;

4. Intelligent, automatic communication between neighborhoods charging apparatuses;

5. Estimated algorithms in household scenarios without an AMI meter;

6. Same manufacturer for smart charging apparatus as on-board PEV charger, thus minimizing risks to the PLC deployment;

7. A smart charging apparatus allows for the collection of critical data between the electric vehicle (PEV) and the utility grid to allow for a smarter approach to charging for everyone from the consumer to the utility company, something that is not possible with a Time-of-Use (TOU) meter;

8. Consumer locale and communication options can be handled by an inexpensive gateway;

9. Secured encrypted communication between the utility grid and charging apparatuses;

10. A common architecture concept enabling the disclosed smart charging apparatus to be used in future Vehicle-to-Grid (V2G) concepts (adaptation of Reverse Power Flow (RPF) as stated in the SAE J2847/3 and the communication protocols established by the SAE J2847/2) and for DC Forward Power Flow (FPF) charging; and 11. Usage of ZigBee over other communication options such as GPRS with extra antennas, can be cheaper.

Although the present disclosure has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A charging apparatus connected between a utility grid and an electric vehicle, the charging apparatus comprising:
   a measurement unit connected to the utility grid and configured to measure an output voltage and an output current of the utility grid;
   a communication unit configured to receive an output voltage information and an output current information of the utility grid, a charging voltage information and a charging current information of the electric vehicle, and a load condition information of the utility grid;
   a control unit connected to the measurement unit and the communication unit;
   wherein the control unit configured to control the utility grid to adaptively charge the electric vehicle via a charging connection unit according to the output voltage information, the output current information, the charging voltage information, the charging current information, and the load condition information when the control unit meets a charge authorization condition;
   wherein the charge authorization condition is a charging permit authorization mode; the electric vehicle judges whether to receive the charging permit command according to the output voltage information and the output current information of the utility grid when the utility grid provides a charging permit command to the electric vehicle via the charging apparatus; wherein the electric vehicle receives the charging permit command when the output voltage and output current of the utility grid meet the required charging voltage and charging current of the electric vehicle.

2. The charging apparatus in claim 1, wherein before the utility grid provides the charging permit command to the electric vehicle via the charging apparatus, the utility grid judges whether to receive the charging request command according to the load conditions of the utility grid when the electric vehicle provides a charging request command to the utility via the charging apparatus; wherein the utility grid receives the charging request command when the load condition is a light-load condition; whereas the utility grid rejects the charging request command when the load condition is a heavy-load condition.

3. The charging apparatus in claim 1, wherein after the utility grid provides the charging permit command to the electric vehicle via the charging apparatus, the utility grid judges whether to receive the charging validation command according to the required charging voltage information and the charging current information of the electric vehicle when the electric vehicle provides a charging validation command to the utility grid via the charging apparatus; wherein the utility grid receives the charging validation command when the required charging voltage and charging current of the electric vehicle meet the output voltage and output current of the utility grid.

4. The charging apparatus in claim 1, wherein the charging connection unit is a SAE J1772 connector with a power line communication.

5. The charging apparatus in claim 1, wherein the communication unit has a ZigBee protocol function, a Wi-Fi protocol function, or a BLUETOOTH protocol function.

6. The charging apparatus in claim 1, further comprising:
a display unit connected to the control unit and configured to display conditions of supplying power from the utility grid to the electrical vehicle; and
a protection unit connected to the control unit and configured to provide a ground fault protection, an over-current protection, or an over-voltage protection.

7. A smart charging system for mobile vehicles comprising:
a charging apparatus connected between a utility grid and an electric vehicle; wherein the charging apparatus is supplied by the utility grid and the electric vehicle is charged by the charging apparatus;
a meter operationally connected between the utility gird and the charging apparatus; wherein the meter is communicated to the utility grid to obtain an output voltage information and an output current information provided from the utility grid to the charging apparatus; and
a cloud server operationally connected to the utility grid; wherein the cloud server is further operationally connected to the charging apparatus via a gateway apparatus to receive the output voltage information and the output current information of the utility grid and a charging voltage information and a charging current information of the electric vehicle;
wherein the charging apparatus configured to adaptively charge the electric vehicle according to the output voltage information, the output current information, the charging voltage information, the charging current information, and a load condition information of the utility grid when the charging apparatus meets a charge authorization condition;
wherein the charge authorization condition is a charging permit authorization mode; the electric vehicle judges whether to receive the charging permit command according to the output voltage information and the output current information of the utility grid when the utility grid provides a charging permit command to the electric vehicle via the charging apparatus; wherein the electric vehicle receives the charging permit command when the output voltage and output current of the utility grid meet the required charging voltage and charging current of the electric vehicle.

8. The smart charging system in claim 7, wherein before the utility grid provides the charging permit command to the electric vehicle via the charging apparatus, the utility grid judges whether to receive the charging request command according to the load conditions of the utility grid when the electric vehicle provides a charging request command to the utility via the charging apparatus; wherein the utility grid receives the charging request command when the load condition is a light-load condition; whereas the utility grid rejects the charging request command when the load condition is a heavy-load condition.

9. The smart charging system in claim 7, wherein after the utility grid provides the charging permit command to the electric vehicle via the charging apparatus, the utility grid judges whether to receive the charging validation command according to the required charging voltage information and the charging current information of the electric vehicle when the electric vehicle provides a charging validation command to the utility grid via the charging apparatus; wherein the utility grid receives the charging validation command when the required charging voltage and charging current of the electric vehicle meet the output voltage and output current of the utility grid.

10. The smart charging system in claim 7, wherein the meter is a smart meter; the meter is communicated to the charging apparatus through a wireless local area network protocol; wherein the meter is communicated to the charging apparatus via a ZigBee protocol, a Wi-Fi protocol, or a BLUETOOTH protocol; the gateway apparatus is a ZigBee gateway, a Wi-Fi gateway, or a BLUETOOTH gateway.

11. The smart charging system in claim 10, wherein the charging apparatus is communicated to the ZigBee gateway via the ZigBee protocol and the cloud server is communicated to the ZigBee gateway via the Ethernet protocol when the charging apparatus is operationally connected to the cloud server via the ZigBee gateway; wherein the charging apparatus is communicated to the Wi-Fi gateway via the Wi-Fi protocol and the cloud server is communicated to the Wi-Fi gateway via the Ethernet protocol when the charging apparatus is operationally connected to the cloud server via the Wi-Fi gateway; wherein the charging apparatus is communicated to the BLUETOOTH gateway via the BLUETOOTH protocol and the cloud server is communicated to the BLUETOOTH gateway via the Ethernet protocol when the charging apparatus is operationally connected to the cloud server via the BLUETOOTH gateway.

12. A method of smartly charging mobile vehicles for charging an electric vehicle by a utility grid, comprising following steps:
(a) providing a charging apparatus, wherein the charging apparatus is connected between the utility grid and the electric vehicle;
(b) providing a charging request command from the electric vehicle, wherein the charging request command is sent to the utility grid via the charging apparatus to propose a charging request to the utility grid;
(c) providing a charging permit command from the utility grid, wherein the charging permit command is sent to the electric vehicle via the charging apparatus to allow charging the electric vehicle; wherein when the utility grid provides the charging permit command to the electric vehicle, a charging permit authorization mode is further executed between the electric vehicle, the charging apparatus, and the utility grid; the electric vehicle judges whether to receive the charging permit command according to the output voltage information and the output current information of the utility grid when the utility grid provides a charging permit command to the electric vehicle via the charging apparatus; wherein the electric vehicle receives the charging permit command when the output voltage and output current of the utility grid meet the required charging voltage and charging current of the electric vehicle;
(d) providing a charging validation command from the electric vehicle, wherein the charging validation command is sent to the utility grid via the charging apparatus to propose a charging notice to the utility grid; and (e) charging the electric vehicle by the utility grid via the charging apparatus.

13. The method of smartly charging mobile vehicles in claim 12, in step (b), wherein when the electric vehicle provides the charging request command to the utility grid, a charging request authorization mode is further executed between the electric vehicle, the charging apparatus, and the utility grid; the utility grid judges whether to receive the charging request command according to the load conditions of the utility grid when the electric vehicle provides a charging request command to the utility via the charging apparatus; wherein the utility grid receives the charging request command when the load condition is a light-load condition; whereas the utility grid rejects the charging request command when the load condition is a heavy-load condition.

14. The method of smartly charging mobile vehicles in claim 12, in step (d), wherein when the electric vehicle provides the charging validation command to the utility grid, a charging notice authorization mode is further executed between the electric vehicle, the charging apparatus, and the utility grid; the utility grid judges whether to receive the charging validation command according to the required charging voltage information and the charging current information of the electric vehicle when the electric vehicle provides a charging validation command to the utility grid via the charging apparatus; wherein the utility grid receives the charging validation command when the required charging voltage and charging current of the electric vehicle meet the output voltage and output current of the utility grid.

15. The method of smartly charging mobile vehicles in claim 12, further comprising:

providing a meter, wherein the meter is operationally connected between the utility grid and the charging apparatus to communicate to the utility grid and obtain the output voltage information and output current information of the utility grid; and providing a cloud server, wherein the cloud server is operationally connected to the utility grid and further operationally connected to the charging apparatus via a gateway apparatus to receive the output voltage information and the output current information of the utility grid and the charging voltage information and the charging current information of the electric vehicle.

16. The method of smartly charging mobile vehicles in claim 12, wherein the meter is communicated to the charging apparatus via a ZigBee protocol, a Wi-Fi protocol, or a BLUETOOTH protocol; the gateway apparatus is a ZigBee gateway, a Wi-Fi gateway, or a BLUETOOTH gateway.

17. The method of smartly charging mobile vehicles in claim 16, wherein the charging apparatus is communicated to the ZigBee gateway via the ZigBee protocol and the cloud server is communicated to the ZigBee gateway via the Ethernet protocol when the charging apparatus is operationally connected to the cloud server via the ZigBee gateway; wherein the charging apparatus is communicated to the Wi-Fi gateway via the Wi-Fi protocol and the cloud server is communicated to the Wi-Fi gateway via the Ethernet protocol when the charging apparatus is operationally connected to the cloud server via the Wi-Fi gateway; wherein the charging apparatus is communicated to the BLUETOOTH gateway via the BLUETOOTH protocol and the cloud server is communicated to the BLUETOOTH gateway via the Ethernet protocol when the charging apparatus is operationally connected to the cloud server via the BLUETOOTH gateway.

\* \* \* \* \*